(12) United States Patent
Yu et al.

(10) Patent No.: US 11,752,751 B2
(45) Date of Patent: Sep. 12, 2023

(54) BONDING METHOD TO ATTACH ETHYLENE-BASED POLYMER FOAM WITH VULCANIZED RUBBER

(71) Applicant: Dow Global Technologies LLC, Midland, MI (US)

(72) Inventors: Haiyang Yu, Shanghai (CN); Wanfu Ma, Shanghai (CN); Xin Liu, Shanghai (CN)

(73) Assignee: Dow Global Technologies LLC, Midland, MI (US)

( * ) Notice: Subject to any disclaimer, the term of this patent is extended or adjusted under 35 U.S.C. 154(b) by 273 days.

(21) Appl. No.: 17/277,565

(22) PCT Filed: Sep. 20, 2018

(86) PCT No.: PCT/CN2018/106736
§ 371 (c)(1),
(2) Date: Mar. 18, 2021

(87) PCT Pub. No.: WO2020/056678
PCT Pub. Date: Mar. 26, 2020

(65) Prior Publication Data
US 2022/0032596 A1 Feb. 3, 2022

(51) Int. Cl.
*B32B 37/12* (2006.01)
*A43B 13/04* (2006.01)
(Continued)

(52) U.S. Cl.
CPC ............. *B32B 37/12* (2013.01); *A43B 13/04* (2013.01); *A43B 13/12* (2013.01); *B32B 5/18* (2013.01);
(Continued)

(58) Field of Classification Search
CPC ...... B29D 35/142; B32B 37/12; B32B 25/045; B32B 37/02; B32B 2309/02; B32B 2309/022; B32B 2309/025
See application file for complete search history.

(56) References Cited

U.S. PATENT DOCUMENTS

| | | | |
|---|---|---|---|
| 4,101,445 A | 7/1978 | Levine et al. | |
| 4,302,565 A | 11/1981 | Goeke et al. | |

(Continued)

FOREIGN PATENT DOCUMENTS

| | | |
|---|---|---|
| CA | 2871823 A1 | 5/2016 |
| CN | 2380067 | 5/2000 |

(Continued)

*Primary Examiner* — Carson Gross
(74) *Attorney, Agent, or Firm* — Boyle Fredrickson, S.C.

(57) ABSTRACT

A process of adhering a foam structure to a rubber substrate is provided. The foam structure is composed of a first composition comprising a first ethylene-based polymer having a peak melting temperature $T_{E1}$. A film composed of a second composition comprising a second ethylene-based polymer having a melt index≤10 g/10 min and a peak melting temperature $T_{E2}$ is applied to the surface of the rubber substrate to form a rubber substrate/film configuration. A compression force is applied at a temperature $T_v$ (38° C.≤$T_{E2}$<$T_v$) to form a vulcanized rubber/film laminate. The foam structure is applied to a surface of the film of the vulcanized rubber/film laminate to form a vulcanized rubber-film laminate/foam configuration. A compression force is applied at a temperature $T_L$, wherein $T_{E2}$<$T_L$<$T_{E1}$, 15° C.≤($T_{E1}$−$T_L$)≤40° C., and 10° C.≤($T_L$−$T_{E2}$)≤70° C., to form a vulcanized rubber-film/foam laminate.

11 Claims, 1 Drawing Sheet

(51) Int. Cl.

| | | |
|---|---|---|
| *A43B 13/12* | (2006.01) | |
| *B32B 5/18* | (2006.01) | |
| *B32B 7/12* | (2006.01) | |
| *B32B 25/04* | (2006.01) | |
| *B32B 25/08* | (2006.01) | |
| *B32B 25/14* | (2006.01) | |
| *B32B 25/16* | (2006.01) | |
| *B32B 27/06* | (2006.01) | |
| *B32B 27/32* | (2006.01) | |
| *B32B 37/10* | (2006.01) | |
| *B32B 37/18* | (2006.01) | |
| *B32B 37/02* | (2006.01) | |
| *B29D 35/14* | (2010.01) | |

(52) U.S. Cl.
CPC .............. *B32B 7/12* (2013.01); *B32B 25/045* (2013.01); *B32B 25/08* (2013.01); *B32B 25/14* (2013.01); *B32B 25/16* (2013.01); *B32B 27/065* (2013.01); *B32B 27/327* (2013.01); *B32B 37/10* (2013.01); *B32B 37/182* (2013.01); *B29D 35/142* (2013.01); *B32B 37/02* (2013.01); *B32B 2250/03* (2013.01); *B32B 2250/24* (2013.01); *B32B 2266/025* (2013.01); *B32B 2307/30* (2013.01); *B32B 2307/54* (2013.01); *B32B 2307/72* (2013.01); *B32B 2307/748* (2013.01); *B32B 2437/02* (2013.01)

(56) References Cited

U.S. PATENT DOCUMENTS

| | | | |
|---|---|---|---|
| 4,508,842 | A | 4/1985 | Beran et al. |
| 4,973,299 | A | 11/1990 | Rubin et al. |
| 5,143,772 | A | 9/1992 | Iwasa |
| 5,272,236 | A | 12/1993 | Lai et al. |
| 5,278,272 | A | 1/1994 | Lai et al. |
| 5,317,036 | A | 5/1994 | Brady, III et al. |
| 5,332,793 | A | 7/1994 | Cann |
| 5,342,907 | A | 8/1994 | Cann et al. |
| 5,371,145 | A | 12/1994 | Daniell et al. |
| 5,405,901 | A | 4/1995 | Daniell et al. |
| 5,410,003 | A | 4/1995 | Bai |
| 7,608,668 | B2 | 10/2009 | LiPiShan et al. |
| 8,302,233 | B2 | 11/2012 | Spanks et al. |
| 8,756,831 | B2 | 6/2014 | Spanks et al. |
| 2003/0124347 | A1 | 7/2003 | Sasongko |
| 2006/0057396 | A1 | 3/2006 | Sasongko |
| 2012/0295086 | A1 | 11/2012 | Baldwin et al. |
| 2015/0068060 | A1* | 3/2015 | Park .................. A43B 13/04 524/279 |
| 2018/0289104 | A1 | 10/2018 | Huh et al. |

FOREIGN PATENT DOCUMENTS

| | | |
|---|---|---|
| CN | 107400268 A | 11/2017 |
| IN | 201741003226 | 4/2017 |
| KR | 20110124836 A | 11/2011 |

\* cited by examiner

BONDING METHOD TO ATTACH ETHYLENE-BASED POLYMER FOAM WITH VULCANIZED RUBBER

BACKGROUND OF THE INVENTION

The footwear industry is a highly labor intensive industry due to the low level of automation for many processes. In footwear production, the different components or layers of a shoe must be bonded manually. For example, the midsole, which is usually made of a crosslinked foam material, needs to be bonded with the outsole, which is usually a vulcanized rubber. The process of bonding the midsole with the outsole is called stock fitting. After stock fitting, the bonded midsole/outsole needs to be further bonded with the shoe upper. The process of bonding the midsole/outsole with the shoe upper is called shoe assembling. Both stock fitting and shoe assembly have steps which must be done manually.

Stock fitting is a particularly labor intensive job due to the number of steps which must be done manually. For example, the preparation of a crosslinked foam midsole is not a 1:1 foaming process. When injection molding a midsole, the material is injected into a mold which is much smaller than the end product size. The mold is kept closed at the desired temperature for a given time. When the mold opens, the foam expands and the midsole jumps out of the mold. Because the resulting midsole is larger than the size of the mold (not 1:1), it is impossible to preload an outsole into the midsole mold to overmold the midsole on the outsole of the shoe. This restricts the possibility for automation of the stock fitting process.

By further example, a phylon process can also be used for stock fitting by further compressing the midsole preform prior to bonding with the outsole. Because compression of the midsole is only along the thickness direction, the length and width of the midsole are not affected. As a result, thermal lamination between the midsole and the outsole is a possibility; however, shrinkage of the midsole must be prevented and the bonding strength must not be sacrificed in the process.

Consequently, the art recognizes the need for stock fitting processes which address one or more of these deficiencies.

SUMMARY OF THE INVENTION

A process of adhering a foam structure to a rubber substrate, wherein the foam structure is formed from a first composition comprising a first ethylene-based polymer having a peak melting temperature $T_{E1}$, the process comprising the following steps:
  a) applying a film formed from a second composition comprising a second ethylene-based polymer to a surface of the rubber substrate to form a rubber substrate/film configuration, wherein the second ethylene-based polymer has a melt index of less than or equal to 10 g/10 min and a peak melting temperature $T_{E2}$;
  b) applying a compression force to the rubber substrate/film configuration at a temperature $T_v$, wherein $T_{E2} < T_v$ to form a vulcanized rubber/film laminate having an exposed surface of the film;
  c) applying the foam structure to the exposed surface of the film to form a vulcanized rubber-film laminate/foam configuration; and
  d) applying a compression force to the vulcanized rubber-film laminate/foam configuration at a temperature $T_L$, wherein $T_{E2} < T_L < T_{E1}$, 15° C. $\leq (T_{E1} - T_L) \leq$ 40° C., and 10° C. $\leq (T_L - T_{E2}) \leq$ 70° C.

Definitions

Any reference to the Periodic Table of Elements is that as published by CRC Press, Inc., 1990-1991. Reference to a group of elements in this table is by the new notation for numbering groups. For purposes of United States patent practice, the contents of any referenced patent, patent application or publication are incorporated by reference in their entirety (or its equivalent US version is so incorporated by reference) especially with respect to the disclosure of definitions (to the extent not inconsistent with any definitions specifically provided in this disclosure) and general knowledge in the art. The numerical ranges disclosed herein include all values from, and including, the lower and upper value. For ranges containing explicit values (e.g., 1 or 2; or 3 to 5; or 6; or 7), any subrange between any two explicit values is included (e.g., 1 to 2; 2 to 6; 5 to 7; 3 to 7; 5 to 6; etc.). Unless stated to the contrary, implicit from the context, or customary in the art. all parts and percents are based on weight and all test methods are current as of the filing date of this disclosure.

The term "composition" refers to a mixture of materials which comprise the composition, as well as reaction products and decomposition products formed from the materials of the composition.

The terms "comprising," "including," "having" and their derivatives, are not intended to exclude the presence of any additional component, step or procedure, whether or not the same is specifically disclosed. In order to avoid any doubt, all compositions claimed through use of the term "comprising" may include any additional additive. adjuvant, or compound, whether polymeric or otherwise, unless stated to the contrary. In contrast, the term "consisting essentially of" excludes from the scope of any succeeding recitation any other component, step, or procedure, excepting those that are not essential to operability. The term "consisting of" excludes any component, step, or procedure not specifically delineated or listed.

An "alpha-olefin" or α-olefin" is a hydrocarbon molecule or a substituted hydrocarbon molecule (i.e., a hydrocarbon molecule comprising one or more atoms other than hydrogen and carbon, e.g., halogen, oxygen, nitrogen, etc.), the hydrocarbon molecule comprising (i) only one ethylenic unsaturation, this unsaturation located between the first and second carbon atoms, and (ii) at least 2 carbon atoms, preferably of 3 to 20 carbon atoms, in some cases preferably of 4 to 10 carbon atoms and in other cases preferably of 4 to 8 carbon atoms. Nonlimiting examples of α-olefins from which the elastomers are prepared include ethene, propylene, 1-butene, 1-pentene, 1-hexene, 1-octene, 1-dodecene, and mixtures of two or more of these monomers.

An "ethylene-based polymer" or "ethylene polymer" is a polymer that contains a majority amount of polymerized ethylene based on the weight of the polymer, and, optionally, may comprise at least one comonomer. An "ethylene-based interpolymer" is an interpolymer that contains, in polymerized form, a majority amount of ethylene, based on the weight of the interpolymer, and at least one comonomer. Preferably, the ethylene-based interpolymer is a random interpolymer (i.e., comprises a random distribution of it monomeric constituents).

An "ethylene/α-olefin interpolymer" is an interpolymer that contains a majority amount of polymerized ethylene, based on the weight of the interpolymer, and at least one α-olefin. An "ethylene/α-olefin copolymer" is an interpolymer that contains a majority amount of polymerized ethylene, based on the weight of the copolymer. and an α-olefin, as the only two monomer types.

"Foam structure" refers to a formation formed by mixing a blowing agent and other necessary ingredients into a polymer at a temperature from 5° C. to 20° C. higher than the highest (peak) melting temperature of the polymer and then foaming the composition at a suitable temperature at which the blowing agent and any other chemicals (e.g., crosslinking agent, etc.) are activated.

An "interpolymer" is a polymer prepared by the polymerization of at least two different types of monomers. The generic term interpolymer thus includes copolymers (employed to refer to polymers prepared from two different types of monomers), terpolymers (employed to refer to polymers prepared from three different types of monomers), and polymers prepared from more than three different types of monomers.

An "olefin-based polymer" or "polyolefin" is a polymer that contains a majority amount of polymerized olefin monomer, for example, ethylene or propylene, (based on the weight of the polymer), and optionally, may contain at least one comonomer. Nonlimiting examples of an olefin-based polymer include an ethylene-based polymer and a propylene-based polymer.

An "olefin elastomer" or "polyolefin elastomer" or "POE" is an elastomeric polymer comprising at least 50 mole percent (mol %) of units derived from one or more olefins.

"Peak melting temperature," "highest melting temperature," "highest peak melting temperature" and similar terms refer to the Differential Scanning Calorimetry (DSC) melting peak for a polymer which has the highest peak temperature, regardless of whether other peaks are more prominent.

A "polar ethylene-based polymer" refers to an ethylene-based polymer, as defined herein, containing one or more polar groups. A "polar group" is any group that imparts a bond dipole moment to an otherwise essentially nonpolar olefin molecule. Exemplary polar groups include carbonyls, carboxylic acid groups, carboxylic acid anhydrate groups, carboxylic ester groups, epoxy groups, sulfonyl groups, nitrile groups, amide groups, silane groups and the like, and these groups can be introduced into the olefin-based polymer either through grafting or copolymerization. Nonlimiting examples of polar ethylene-based polymers include ethylene/acrylic acid (EAA), ethylene/methacrylic acid (EMAA) and ethylene/acrylate or methacrylate, ethylene/vinyl acetate (EVA). Commercial examples of polar ethylene-based polymers include DuPont ELVAX® ethylene vinyl acetate (EVA) resins, AMPLIFY™ ethylene ethyl acrylate (EEA) copolymer from The Dow Chemical Company, and PRIMACOR™ ethylene/acrylic acid copolymers from The Dow Chemical Company.

A "polymer" is a polymeric compound prepared by polymerizing monomers, whether of the same or a different type. The generic term polymer thus embraces the term "homopolymer" (employed to refer to polymers prepared from only one type of monomer, with the understanding that trace amounts of impurities can be incorporated into the polymer structure), and the term "interpolymer," as defined hereinafter. Trace amounts of impurities, for example, catalyst residues, may be incorporated into and/or within the polymer.

"Multi-block interpolymer," "multi-block copolymer," "segmented copolymer" and like terms refer to a polymer comprising two or more chemically distinct regions or segments (referred to as "blocks") preferably joined in a linear manner, that is, a polymer comprising chemically differentiated units which are joined end-to-end with respect to polymerized ethylenic functionality, rather than in pendent or grafted fashion. In a preferred embodiment, the blocks differ in the amount or type of incorporated comonomer, density, amount of crystallinity, crystallite size attributable to a polymer of such composition, type or degree of tacticity (isotactic or syndiotactic), regio-regularity or regio-irregularity, amount of branching (including long chain branching or hyper-branching), homogeneity or any other chemical or physical property. Compared to block copolymers of the prior art, including copolymers produced by sequential monomer addition, fluxional catalysts, or anionic polymerization techniques, the multi-block copolymers are characterized by unique distributions of both polymer polydispersity (PDI or $M_w/M_n$ or MWD), block length distribution, and/or block number distribution, due, in a preferred embodiment, to the effect of the shuttling agent(s) in combination with multiple catalysts used in their preparation. Representative olefin multi-block interpolymers include the olefin multi-block interpolymers manufactured and sold by The Dow Chemical Company under the trademark INFUSE™. In the context of this disclosure, "multi-block interpolymers" and like terms explicitly excludes olefin-based polymers, halogenated ethylene-based polymers and elastomer rubbers.

"Film," including when referring to a "film layer" in a thicker article, unless expressly having the thickness specified, refers to any thin, flat extruded, cast, or molded article (e.g., sheet) having a generally consistent and uniform thickness up to about 1.0 millimeter.

Test Methods

Asker C Hardness of foam structures was measured in accordance with ASTM D2240 on plaques with the dimensions 15 cm (length)×15 cm (width)×2 cm (thickness) both before lamination and after lamination. Each sample was measured at least 3 times (with a 5 second latency between each measurement) across the surface of the sample. The average was recorded.

Density of the polymers was measured in accordance with ASTM D792, Method B. The result was recorded in grams (g) per cubic centimeter (g/cc or $g/cm^3$).

Melt index (I2) was measured at 190° C. under a load of 2.16 kg according to ASTM D1238. The result was recorded in grams eluted per 10 minutes (g/10 min).

Differential Scanning Calorimetry (DSC)

Differential Scanning Calorimetry (DSC) can be used to measure the melting, crystallization, and glass transition behavior of a polymer over a wide range of temperature. For example, the TA Instruments Q1000 DSC, equipped with an RCS (refrigerated cooling system) and an autosampler was used to perform this analysis. During testing, a nitrogen purge gas flow of 50 ml/min was used. Each sample was melt pressed into a thin film at 190° C.; the melted sample was then air-cooled to room temperature (25° C.). A 3-10 mg, 6 mm diameter specimen was extracted from the cooled polymer, weighed, placed in a light aluminum pan (50 mg), and crimped shut. Analysis was then performed to determine its thermal properties.

The thermal behavior of the sample was determined by ramping the sample temperature up and down to create a heat flow versus temperature profile. First, the sample was rapidly heated to 180° C. and held isothermal for 3 minutes in order to remove its thermal history. Next, the sample was cooled to −80° C. at a 10° C./minute cooling rate and held isothermal at −80° C. for 3 minutes. The sample was then heated to 180° C. (this is the "second heat" ramp) at a 10° C./minute heating rate. The cooling and second heating curves were recorded. The values determined are extrapolated onset of melting, $T_m$, and extrapolated onset of crystallization, $T_c$. Heat of fusion $(H_f)$ (in Joules per gram), and the calculated % crystallinity for polyethylene samples using the following Equation: % Crystallinity=$((H_f)/292$ J/g$)\times 100$.

The heat of fusion $(H_f)$ (also known as melt enthalpy) and the peak melting temperature were reported from the second heat curve.

Melting point, $T_m$, was determined from the DSC heating curve by first drawing the baseline between the start and end of the melting transition. A tangent line was then drawn to the data on the low temperature side of the melting peak. Where this line intersects the baseline is the extrapolated onset of melting $(T_m)$. This is as described in Bernhard Wunderlich, *The Basis of Thermal Analysis, in Thermal Characterization of Polymeric Materials* 92, 277278 (Edith A. Turi ed., 2d ed. 1997).

The peak melting temperature $(T_E)$ is determined from the DSC heating curve by identifying the temperature corresponding to the highest melting peak position.

Hardness vs. control foam is a relative percentage calculated in terms of $H_1/H_0*100\%$, wherein $H_0$ is the foam hardness before lamination with the adhesive film and $H_1$ is the foam hardness of the same foam measured after the final lamination to produce the vulcanized rubber-film/foam laminate.

Figure 1:
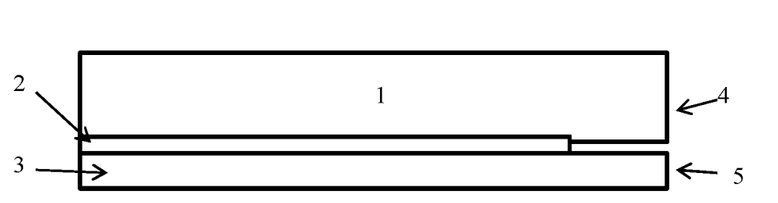

Bonding strength was measured by the T-peel test using an INSTRON 5566 and a sample having the structure shown in FIG. 1. The un-adhered ends of the bonded samples were clamped in the top and bottom clamps, respectively, of the INSTRON. The initial clamp distance was 1 inch. The bonded sample was peeled at a crosshead speed of 100 mm/min. The peel force was recorded and average peel force calculated. Peel strength (N/mm) was calculated as follows: average peel force (N)/sample width (mm). In the FIG. 1, the foam layer is 1, the adhesive layer is 2, and the rubber layer is 3, with un-adhered ends 4, 5 belonging to the foam layer 1 and rubber layer 3, respectively.

Tensile strength is measured in accordance with D638 and reported in MPa.

DETAILED DESCRIPTION OF THE INVENTION

A process of adhering a foam structure to a rubber substrate, is disclosed herein. The process of adhering a foam structure to a rubber substrate, wherein the foam structure is formed from a first composition comprising a first ethylene-based polymer having a peak melting temperature $T_{E1}$, the process comprises the following steps:

a) applying a film formed from a second composition comprising a second ethylene-based polymer to a surface of the rubber substrate to form a rubber substrate/film configuration, wherein the second ethylene-based polymer has a melt index of less than or equal to 10 g/10 min and a peak melting temperature $T_{E2}$;

b) applying a compression force to the rubber substrate/film configuration at a temperature $T_v$, wherein 38° C.$\leq T_{E2} < T_v$ to form a vulcanized rubber/film laminate having an exposed surface of the film;

c) applying the foam structure to the exposed surface of the film to form a vulcanized rubber-film laminate/foam configuration; and d) applying a compression force to the vulcanized rubber-film laminate/foam configuration at a temperature $T_L$, wherein $T_{E2} < T_L < T_{E1}$, 15° C.$\leq (T_{E1} - T_L) \leq 40$° C., and 10° C.$\leq (T_L - T_{E2}) \leq 70$° C. to form a vulcanized rubber-film/foam laminate.

A process of adhering a foam structure to a rubber substrate may comprise a combination of two or more embodiments as described herein.

Each component of a process of adhering a foam structure to a rubber substrate may comprise a combination of two or more embodiments as described herein.

Ethylene-Based Polymer

An ethylene-based polymer is a polymer comprising, in polymerized form, a majority amount (greater than 50 wt %) units derived from ethylene, based on the total weight of the polymer. In an embodiment, the ethylene-based polymer is an ethylene homopolymer or ethylene-based copolymer, such as an ethylene/alpha-olefin copolymer or a polar ethylene-based copolymer. Nonlimiting examples of suitable ethylene/alpha-olefin copolymers include copolymers of ethylene and one or more alpha-olefins having 3 to 12 carbon atoms. Nonlimiting examples of suitable polar ethylene-based copolymers include ethylene vinyl acetate (EVA), ethylene ethyl acrylate (EEA) and the link. Suitable ethylene homopolymers and ethylene-based copolymers can be heterogeneous or homogeneous.

Typical catalyst systems which are used to prepare suitable ethylene homopolymers and ethylene/alpha-olefin copolymers are magnesium/titanium based catalyst, systems, which can be exemplified by the catalyst system described in U.S. Pat. No. 4,302,565 (heterogeneous polyethylenes); vanadium based catalyst systems such as those described in U.S. Pat. No. 4,508,842 (heterogeneous polyethylenes) and U.S. Pat. Nos. 5,332,793; 5,342,907; and 5,410,003 (homogeneous polyethylenes); a chromium based catalyst system such as that described in U.S. Pat. No. 4,101,445; a metallocene catalyst system such as those described in U.S. Pat. Nos. 4,973,299, 5,272,236, 5,278,272, and 5,317,036 (homogeneous polyethylenes); or other transition metal catalyst systems. Many of these catalyst systems are often referred to as Ziegler-Natta catalyst systems or Phillips catalyst systems. Catalyst systems which use chromium or molybdenum oxides on silica-alumina supports can be included here. Processes for preparing suitable ethylene homopolymers and ethylene/alpha-olefin copolymers are also described in the above-mentioned documents. In situ blends of polyethylene homopolymers and/or ethylene/alpha-olefin copolymers and processes and catalyst systems for providing the same are described in U.S. Pat. Nos. 5,371,145 and 5,405,901.

Nonlimiting examples of suitable ethylene homopolymers and ethylene/alpha-olefin copolymers include low density homopolymers of ethylene made by high pressure processes (HP-LDPE), linear low density polyethylenes (LLDPE), very low density polyethylenes (VLDPE), medium density polyethylenes (MDPE), high density polyethylene (HDPE) having a density greater than 0.940 g/cc, and metallocene copolymers with densities less than 0.900 g/cc.

VLDPE can be a copolymer of ethylene and one or more alpha-olefins having from 3 to 12 carbon atoms. The density of the VLDPE can be from 0.870 g/cc to 0.915 g/cc. The LLDPE can include VLDPE and MDPE, which are also linear, but, generally, have a density from 0.916 g/cc to 0.925 g/cc. LLDPE can be a copolymer of ethylene and one or more alpha-olefins having from 3 to 12 carbon atoms.

In an embodiment, the ethylene-based polymer is an ethylene-based copolymer. In an embodiment, the ethylene-based copolymer is selected from an ethylene/alpha-olefin copolymer and EVA.

In an embodiment, an ethylene-based polymer, or further, an ethylene/alpha-olefin copolymer, is polyolefin elastomer (POE). POEs are prepared with at least one metallocene catalyst. The POE may also be prepared with more than one metallocene catalyst or may be a blend of multiple elastomer resins prepared with different metallocene catalysts. In an embodiment, the POE is a substantially linear ethylene polymer (SLEP). SLEPs and other metallocene catalyzed elastomers described, for example, in U.S. Pat. No. 5,272,236, incorporated herein by reference. Nonlimiting examples of suitable POEs include ENGAGE™ elastomer resins available from the Dow Chemical Co., or EXACT™ polymers from Exxon or TAFMER™ polymers from Mitsui Chemical.

In an embodiment, the POE is an ethylene-based polymer, and further an ethylene-based copolymer. The ethylene-based copolymer comprises, in polymerized form, ethylene and an alpha-olefin comonomer. Nonlimiting examples of alpha-olefin comonomers include propylene, 1-butene, 1-pentene, 1-hexene, 1-octene, 1-dodecene, and mixtures of these or other comonomers. In an embodiment, the POE is an ethylene/1-octene copolymer or ethylene/1-butene copolymer.

The POE has a density from 0.850 g/cc, or 0.860 g/cc, or 0.870 g/cc to 0.880 g/cc, or 0.890 g/cc, or 0.900 g/cc, or 0.910 g/cc, as measured in accordance with ASTM D792.

The POE has a melt index from 0.25 g/10 min, or 0.5 g/10 min, or 1 g/10 min, or 5 g/10 min to 10 g/10 min, or 15 g/10 min, or 20 g/10 min, or 25 g/10 min, or 30 g/10 min, as measured in accordance with ASTM D1238 (190° C., 2.16 kg).

In an embodiment, an ethylene-based polymer, or further, an ethylene/alpha-olefin copolymer, is an ethylene/alpha-olefin multi-block interpolymer. In an embodiment, the ethylene/α-olefin multi-block interpolymer is an ethylene/α-olefin multi-block copolymer.

The term "ethylene/α-olefin multi-block interpolymer" refers to an ethylene/$C_4$-$C_8$ α-olefin multi-block copolymer consisting of ethylene and one or more copolymerizable $C_4$-$C_8$ α-olefin comonomer in polymerized form (and optional additives), the polymer characterized by multiple blocks or segments of two polymerized monomer units differing in chemical or physical properties, the blocks joined (or covalently bonded) in a linear manner, that is, a polymer comprising chemically differentiated units which are joined end-to-end with respect to polymerized ethylenic functionality. In an embodiment, the ethylene/α-olefin multi-block interpolymer is an ethylene/α-olefin multi-block copolymer. The term "ethylene/α-olefin multi-block copolymer" refers to an ethylene/$C_4$-$C_8$ α-olefin multi-block copolymer consisting of ethylene and one copolymerizable $C_4$-$C_8$ α-olefin comonomer in polymerized form, the polymer characterized by multiple blocks or segments of two polymerized monomer units differing in chemical or physical properties, the blocks joined (or covalently bonded) in a linear manner, that is, a polymer comprising chemically differentiated units which are joined end-to-end with respect to polymerized ethylenic functionality. An ethylene/α-olefin multi-block copolymer includes block copolymers with two blocks (di-block) and more than two blocks (multi-block). The $C_4$-$C_8$ α-olefin is selected from butene, hexene, and octene. The ethylene/α-olefin multi-block copolymer is void of, or otherwise excludes, styrene (i.e., is styrene-free), and/or vinyl aromatic monomer, and/or conjugated diene. When referring to amounts of "ethylene" or "comonomer" in the copolymer, it is understood that this refers to polymerized units thereof. In some embodiments, the ethylene/α-olefin multi-block copolymer can be represented by the following formula: (AB)n; where n is at least 1, preferably an integer greater than 1, such as 2, 3, 4, 5, 10, 15, 20, 30, 40, 50, 60, 70, 80, 90, 100, or higher, "A" represents a hard block or segment, and "B" represents a soft block or segment. The As and Bs are linked, or covalently bonded, in a substantially linear fashion, or in a linear manner, as opposed to a substantially branched or substantially star-shaped fashion. In other embodiments, A blocks and B blocks are randomly distributed along the polymer chain. In other words, the block copolymers usually do not have a structure as follows: AAA-AA-BBB-BB. In an embodiment, the ethylene/α-olefin multi-block copolymer does not have a third type of block, which comprises different comonomer (s). In another embodiment, each of block A and block B has monomers or comonomers substantially randomly distributed within the block. In other words, neither block A nor block B comprises two or more sub-segments (or sub-blocks) of distinct composition, such as a tip segment, which has a substantially different composition than the rest of the block.

Preferably, ethylene comprises the majority mole fraction of the whole base ethylene/α-olefin multi-block copolymer, i.e., ethylene comprises at least 50 wt % of the whole base ethylene/α-olefin multi-block copolymer. More preferably, ethylene comprises at least 60 wt %, at least 70 wt %, or at least 80 wt %, with the substantial remainder of the whole ethylene/α-olefin multi-block copolymer comprising the $C_4$-$C_8$ α-olefin comonomer. In an embodiment, the ethylene/α-olefin multi-block copolymer contains from 50 wt %, or 60 wt %, or 65 wt % to 80 wt %, or 85 wt %, or 90 wt % ethylene. For many ethylene/octene multi-block copolymers, the composition comprises an ethylene content greater than 80 wt % of the whole ethylene/octene multi-block copolymer and an octene content of from 10 wt % to 15 wt %, or from 15 wt % to 20 wt % of the whole ethylene/octene multi-block copolymer.

The ethylene/α-olefin multi-block copolymer includes various amounts of "hard" segments and "soft" segments. "Hard" segments are blocks of polymerized units in which ethylene is present in an amount greater than 90 wt %, or 95 wt/o, or greater than 95 wt/o, or greater than 98 wt %, based on the weight of the polymer, up to 100 wt %. In other words, the comonomer content (content of monomers other than ethylene) in the hard segments is less than 10 wt %, or 5 wt %, or less than 5 wt %, or less than 2 wt %, based on the weight of the polymer, and can be as low as zero. In some embodiments, the hard segments include all, or substantially all, units derived from ethylene. "Soft" segments are blocks of polymerized units in which the comonomer content (content of monomers other than ethylene) is greater than 5 wt %, or greater than 8 wt %, or greater than 10 wt %, or greater than 15 wt %, based on the weight of the polymer. In an embodiment, the comonomer content in the soft segments is greater than 20 wt %, or greater than 25 wt %, or greater than 30 wt %, or greater than 35 wt %, or greater than 40 wt %, or greater than 45 wt %, or greater than 50 wt %, or greater than 60 wt % and can be up to 100 wt %.

The soft segments can be present in an base ethylene/α-olefin multi-block copolymer from 1 wt %, or 5 wt %, or 10 wt %, or 15 wt %, or 20 wt %, or 25 wt %, or 30 wt %, or 35 wt %, or 40 wt %, or 45 wt % to 55 wt %, or 60 wt %, or 65 wt %, or 70 wt %, or 75 wt %, or 80 wt %, or 85 wt %, or 90 wt %, or 95 wt %, or 99 wt % of the total weight of the ethylene/α-olefin multi-block copolymer. Conversely, the hard segments can be present in similar ranges. The soft segment weight percentage and the hard segment weight percentage can be calculated based on data obtained from DSC or NMR. Such methods and calculations are disclosed in, for example, U.S. Pat. No. 7,608,668, the disclosure of which is incorporated by reference herein in its entirety. In particular, hard and soft segment weight percentages and comonomer content may be determined as described in column 57 to column 63 of U.S. Pat. No. 7,608,668.

The ethylene/α-olefin multi-block copolymer comprises two or more chemically distinct regions or segments (referred to as "blocks") joined (or covalently bonded) in a linear manner, that is, it contains chemically differentiated units which are joined end-to-end with respect to polymerized ethylenic functionality, rather than in pendent or grafted fashion. In an embodiment, the blocks differ in the amount or type of incorporated comonomer, density, amount of crystallinity, crystallite size attributable to a polymer of such composition, type or degree of tacticity (isotactic or syndiotactic), regio-regularity or regio-irregularity, amount of branching (including long chain branching or hyper-branching), homogeneity or any other chemical or physical property. Compared to block interpolymers of the prior art, including interpolymers produced by sequential monomer addition, fluxional catalysts, or anionic polymerization techniques, the present ethylene/α-olefin multi-block copolymer is characterized by unique distributions of both polymer polydispersity (PDI or Mw/Mn or MWD), polydisperse block length distribution, and/or polydisperse block number distribution, due, in an embodiment, to the effect of the shuttling agent(s) in combination with multiple catalysts used in their preparation.

In an embodiment, the ethylene/α-olefin multi-block copolymer is produced in a continuous process and possesses a polydispersity index (Mw/Mn) from 1.7 to 3.5, or from 1.8 to 3, or from 1.8 to 2.5, or from 1.8 to 2.2. When produced in a batch or semi-batch process, the ethylene/α-olefin multi-block copolymer possesses Mw/Mn from 1.0 to 3.5, or from 1.3 to 3, or from 1.4 to 2.5, or from 1.4 to 2.

In addition, the ethylene/α-olefin multi-block copolymer possesses a PDI (or Mw/Mn) fitting a Schultz-Flory distribution rather than a Poisson distribution. The present ethylene/α-olefin multi-block copolymer has both a polydisperse block distribution as well as a polydisperse distribution of block sizes. This results in the formation of polymer products having improved and distinguishable physical properties. The theoretical benefits of a polydisperse block distribution have been previously modeled and discussed in Potemkin, *Physical Review E* (1998) 57 (6), pp. 6902-6912, and Dobrynin, *J. Chem. Phys.* (1997) 107 (21), pp. 9234-9238.

In an embodiment, the ethylene/α-olefin multi-block copolymer possesses a most probable distribution of block lengths.

Nonlimiting examples of suitable ethylene/α-olefin multi-block copolymer are disclosed in U.S. Pat. No. 7,608,668, the entire content of which is incorporated by reference herein.

In an embodiment, the ethylene/α-olefin multi-block copolymer has hard segments and soft segments, is styrene-free, consists of only (i) ethylene and (ii) a $C_4$-$C_8$ α-olefin (and optional additives), and is defined as having a Mw/Mn from 1.7 to 3.5, at least one melting point, Tm, in degrees Celsius, and a density, d, in grams/cubic centimeter, wherein the numerical values of Tm and d correspond to the relationship: $Tm > -2002.9 + 4538.5(d) - 2422.2(d)^2$, where the density, d, is from 0.850 g/cc, or 0.860 g/cc, or 0.870 g/cc to 0.875 g/cc, or 0.877 g/cc, or 0.880 g/cc, or 0.890 g/cc; and the melting point, Tm, is from 110° C., or 115° C., or 120° C. to 122° C., or 125° C., or 130° C., or 135° C.

In an embodiment, the ethylene/α-olefin multi-block copolymer is an ethylene/I-octene multi-block copolymer (consisting only of ethylene and octene comonomer) and has one, some, or all of the following properties: (i) a Mw/Mn from 1.7, or 1.8 to 2.2, or 2.5, or 3.5; and/or (ii) a density from 0.850 g/cc, or 0.860 g/cc, or 0.865 g/cc, or 0.870 g/cc to 0.877 g/cc, or 0.880 g/cc, or 0.900 g/cc; and/or (iii) a melting point, Tm, from 115° C., or 118° C., or 119° C., or 120° C. to 121° C., or 122° C., or 125° C.; and/or (iv) a melt index (12) from 0.1 g/10 min, or 0.5 g/10 min to 1.0 g/10 min, or 2.0 g/10 min, or 5 g/10 min, or 10 g/10 min, or 50 g/10 min; and/or (v) 50-85 wt % soft segment and 4015 wt %/o hard segment; and/or (vi) from 10 mol %, or 13 mol %, or 14 mol %, or 15 mol % to 16 mol %, or 17 mol %, or 18 mol %, or 19 mol %, or 20 mol % $C_4$-$C_{12}$ α-olefin in the soft segment; and/or (vii) from 0.5 mol %, or 1.0 mol %, or 2.0 mol %, or 3.0 mol % to 4.0 mol %, or 5 mol %, or 6 mol %, or 7 mol %, or 9 mol % octene in the hard segment; and/or (viii) an elastic recovery (Re) from 50%, or 60% to 70%, or 80%, or 90%, at 300% $min^{-1}$ deformation rate at 21° C. as measured in accordance with ASTM D1708; and/or (ix) a polydisperse distribution of blocks and a polydisperse distribution of block sizes; and/or (x) a Shore A hardness from 50, or 60, or 65, or 70, or 75 to 80, or 85, or 90. In a further embodiment, the ethylene/1-octene multi-block copolymer has all of the above properties (i)-(x).

In an embodiment, the ethylene/α-olefin multi-block copolymer is an ethylene/octene multi-block copolymer. The ethylene/octene multi-block copolymer is sold under the tradename INFUSE™, available from The Dow Chemical Company, Midland, Mich., USA.

Ethylene-based polymers may comprise two or more embodiments discussed herein.

Foamed Structure

In an embodiment the process includes applying a foam structure to an exposed surface of a film, wherein the foam is formed from a first composition comprising a first ethylene-based polymer.

A first ethylene-based polymer may comprise any embodiment, or combination of embodiments, discussed herein.

In an embodiment, the first ethylene-based polymer is an ethylene/alpha-olefin multi-block interpolymer, or further an ethylene/alpha-olefin multi-block copolymer, as discussed herein. In an embodiment, the ethylene/alpha-olefin multi-block interpolymer is an ethylene/octene multi-block copolymer, such as an ethylene/octene multi-block copolymer sold under the tradename INFUSE™, available from The Dow Chemical Company, Midland, Mich., USA.

In an embodiment, the first ethylene-based polymer has a peak melting temperature ($T_{E1}$) from 115° C., or 120° C., or 125° C. to 130° C., or 135° C. If more than one peak melting temperature exists in the DSC profile, the peak melting temperature ($T_{E1}$) is the highest temperature peak. In an embodiment, the first ethylene-based polymer has a single melting temperature.

In an embodiment, the first ethylene-based polymer has a density from 0.850 g/cc, or 0.860 g/cc, or 0.870 g/cc to 0.875 g/cc, or 0.877 g/cc, or 0.880 g/cc, or 0.890 g/cc.

In an embodiment, the first ethylene-based polymer has a melt index from 0.1 g/10 min, or 0.5 g/10 min to 1.0 g/10 min, or 2.0 g/10 min, or 5 g/10 min, or 10 g/10 min, or 50 g/10 min.

In an embodiment, the first ethylene-based polymer has a Shore A hardness from 50, or 60, or 65, or 70, or 75 to 80, or 85, or 90.

In an embodiment, the first ethylene-based polymer is an ethylene/alpha-olefin multi-block interpolymer, or further an ethylene/alpha-olefin multi-block copolymer, and has one, some or all of the following properties: (i) a peak melting temperature ($T_{E1}$) from 115° C., or 120° C., or 125° C. to 130° C., or 135° C.; and/or (ii) a density from 0.850 g/cc, or 0.860 g/cc, or 0.870 g/cc to 0.875 g/cc, or 0.877 g/cc, or 0.880 g/cc, or 0.890 g/cc; and/or (iii) a melt index from 0.1 g/10 min, or 0.5 g/10 min to 1.0 g/10 min, or 2.0 g/10 min, or 5 g/10 min, or 10 g/10 min, or 50 g/10 min; and/or (iv) a Shore A hardness from 50, or 60, or 65, or 70, or 75 to 80, or 85, or 90. In an embodiment, the first ethylene-based polymer has, one. two, three or all four of properties (i)-(iv).

In an embodiment, the first composition comprises from 85 wt %, or 87 wt %, or 90 wt % to 92 wt %, or 95 wt %, or 97 wt %, or 99 wt % or 100 wt % of the first ethylene-based polymer, based on the total weight of the first composition.

In an embodiment, the first composition comprises the first ethylene-based polymer to the exclusion of all other polymers.

The first composition further includes a blowing agent. A "blowing agent" is a substance that is capable of producing a cellular structure in the composition via a foaming process. A nonlimiting example of a suitable blowing agent is a chemical blowing agent, that is, a substance which forms gaseous products. Nonlimiting examples of suitable chemical blowing agents include sodium bicarbonate, azodicarbonamide, 4,4'-oxydibenzenesulfonyl hydrazide, and carbazides.

The blowing agent is present in an amount from greater than 0.0 wt %, or 0.1 wt %, or 0.5 wt %, or 1.0 wt % to 2.0 wt %, or 3.0 wt %, or 5.0 wt/o, or 10.0 wt %, based on the total weight of the first composition.

The first composition optionally includes a crosslinking agent. The crosslinking agents and, optionally, blowing agent, are added to the ethylene-based polymer and serve to crosslink the ethylene-based polymer with itself.

Nonlimiting examples of suitable crosslinking agents include azido and vinyl functional silanes, organic peroxides and multifunctional vinyl monomers. Nonlimiting examples of azido-functional silane compounds include the group of azido trialkoxysilanes such as 2-(trimethoxysilyl) ethyl phenyl sulfonyl azide and (triethoxy silyl)hexyl sulfonyl azide. Nonlimiting examples of vinyl-functional silane compounds include vinyl functional alkoxy silanes such as vinyl trimethoxy silane and vinyl triethoxy silane. A nonlimiting example of organic peroxides includes dicumyl peroxide (DCP). Nonlimiting examples of multifunctional vinyl monomers include trimethylolpropane triacrylate (TMPTA) and pentaerythritol triacrylate (PETA). The crosslinking agent in present in an amount from 0 wt/o, or greater than 0 wt/o, or 0.1 wt %, or 0.5 wt %, or 1.0 wt % to 2.0 wt %/o, or 3.0 wt %, or 5.0 wt %, or 10.0 wt %, based on the total weight of the first composition.

The first composition may further include an activator. An activator is a substance which activates, or helps initiate or sustain, the chemical reaction of the blowing agent. Nonlimiting examples of suitable activators include zinc oxide, zinc stearate, and combinations thereof. In an embodiment, the activator is present in an amount from 0 wt %, or greater than 0 wt %, or 0.1 wt %, or 0.2 wt %, or 0.3 wt %, or 0.4 wt % to 0.5 wt %, or 0.6 wt %, or 0.8 wt %, or 1.0 wt %, or 1.5 wt %, or 2.0 wt %, based on the total weight of the first composition.

The first composition may further include a filler. Nonlimiting examples of fillers include calcium carbonate, titanium dioxide, tac, and combinations thereof. In an embodiment, the filler is present in an amount from 0 wt %, or greater than 0 wt %, or 0.1 wt %, or 0.5 wt %, or 1.0 wt %, or 1.5 wt %, or 2.0 wt % to 2.5 wt %, or 3.0 wt %, or 3.5 wt %, or 4.0 wt %, or 5.0 wt %, or 6.0 wt %, or 10.0 wt %, based on the total weight of the first composition.

The first composition may comprise two or more embodiments as disclosed herein.

The first composition comprising the first ethylene-based polymer is foamed to form a foamed structure.

To form the foamed structure, the first ethylene-based polymer is melted before any additional components, e.g., crosslinking agent or additives, are added to form a melted polymer mass. The blowing agent and, optionally, crosslinking agent, activator, and any fillers are then added. The melted polymer mass is further heated to a temperature which is from 5° C., or 10° C., or 15° C. to 20° C. higher than the peak melting temperature ($T_{E1}$) of the first ethylene-based polymer.

In an embodiment, the first ethylene-based polymer is melted before any additional components, e.g., blowing agent or crosslinking agent, are added to form a melted polymer mass. The melted polymer mass is then heated in a foam mold, such as a bun foam mold, and put in a foam press at a selected temperature and pressure for an amount of time to initiate the reaction of the blowing agent and, if present. crosslinking agent. The melted polymer mass expands to form the foamed article once the pressure is released and the article removed from the mold.

In an embodiment, the melted polymer mass is pressed at a foaming temperature from 100° C., or 110° C., or 120° C., or 130° C., or 140° C., or 150° C. to 160° C., or 170° C., or 180° C., or 190° C., or 200° C.

In an embodiment, the melted polymer mass is pressed at a pressure from 90 Bar, or 95 Bar, or 100 Bar to 105 Bar, or 110 Bar, or 115 Bar, or 120 Bar.

In an embodiment, the melted polymer mass is pressed for a time from 6 minutes. or 8 minutes, or 10 minutes, or 12 minutes to 14 minutes, or 16 minutes, or 18 minutes, or 20 minutes.

The foam structure may comprise two or more embodiments as disclosed herein.

Rubber Substrate

The present disclosure provides a process of adhering a foam structure to a rubber substrate. The substrate is typically in the form of a sheet, and can comprise any rubber, natural or synthetic. Synthetic rubbers include, but are not limited to, polyacrylate rubber, ethylene acrylate rubber, polyester urethane, polybutadiene, polychloroprene, ethylene propylene (EP), ethylene propylene diene monomer (EPDM), polyether urethane, perfluorocarbon rubber, polyisoprene, acrylonitrile butadiene (NBR), polysiloxanes, styrene ethylene butylene styrene (SEBS), styrene butadiene (SBR), and the like.

In an embodiment, the rubber substrate is formed from a composition comprising the rubber and one or more additives, including, for example, one or more accelerators, curing additives and/or processing aids.

In an embodiment, the rubber substrate comprises, consists essentially of, or consists of, EPDM.

The rubber substrate is formed by melt compounding the composition comprising the rubber and forming the melted compound into a sheet-like substrate. In an embodiment, the melted compound is roll milled into the rubber substrate having a thickness from approximately 2 mm, or 3 mm, or 5 mm to 6 mm, or 8 mm. or 10 mm.

In an embodiment, the rubber substrate is cold pressed.

In an embodiment, the rubber substrate is cold pressed at a temperature from 90° C., or 95° C. to 100° C., or 105° C., or 110° C.

In an embodiment, the rubber substrate is cold pressed at a force from 150 kN, or 180 kN to 25200 kN or 220 kN, or 250 kN.

In an embodiment, the rubber substrate is cold pressed for a duration from 5 mins, or 6 mins, or 7 mins to 8 mins, or 9 mins, or 10 mins, or 12 mins.

In an embodiment, the rubber substrate is further cold pressed at a temperature from 90° C., or 95° C. to 100° C., or 105° C., or 110° C. at a force from 150 kN, or 180 kN to 200 kN, or 220 kN, or 250 kN for a duration from 5 mins, or 6 mins, or 7 mins to 8 mins, or 9 mins, or 10 mins, or 12 mins to form a rubber substrate which is a sheet.

In an embodiment, the rubber substrate is a sheet having a thickness from 0.2 mm, or 0.4 mm, or 0.5 mm to 0.6 mm, or 0.8 mm, or 1.0 mm.

A rubber substrate may comprise two or more embodiments disclosed herein.

Adhesive Film

The process of adhering a foam structure to a rubber substrate includes applying a film formed from a second composition comprising a second ethylene-based polymer to a surface of the rubber substrate.

A second ethylene-based polymer may comprise any embodiment, or combination of embodiments, discussed herein.

In an embodiment, the second ethylene-based polymer is an ethylene homopolymer or ethylene-based interpolymer, or further, an ethylene-based copolymer. In an embodiment, the ethylene-based copolymer is a POE. In an embodiment, the second ethylene-based polymer is a random ethylene-based copolymer. In an embodiment, the random ethylene-based copolymer is an ethylene/alpha-olefin copolymer or EVA. In an embodiment, the ethylene-based copolymer is a random ethylene/octene copolymer or a random ethylene/butene copolymer.

In a further embodiment, the second ethylene-based polymer is an ethylene/alpha-olefin random copolymer. In a further embodiment, the second ethylene-based polymer is selected from an ethylene/octene random copolymer and an ethylene/butene random copolymer.

In an embodiment, the second ethylene-based polymer has a peak melting temperature $T_{E2}$ from 30° C., or 35° C., or 40° C., or 45° C., or 50° C. to 55° C., or 60° C., or 65° C., or 70° C., or 75° C., or 80° C. If more than one melting temperature exists in the DSC profile, the peak melting temperature ($T_{E2}$) is the highest temperature peak. In an embodiment, the second ethylene-based polymer has a single melting temperature.

In an embodiment, the peak melting temperature of the second ethylene-based polymer ($T_{E2}$) is lower than the peak melting temperature of the first ethylene-based polymer ($T_{E1}$).

In an embodiment, the second ethylene-based polymer has a peak melting temperature ($T_{E2}$) from 30° C., or 35° C., or 40° C., or 45° C., or 50° C. to 55° C., or 60° C., or 65° C., or 70° C., or 75° C., or 80° C. and the peak melting temperature of the second ethylene-based polymer ($T_{E2}$) is lower than the peak melting temperature of the first ethylene-based polymer ($T_{E1}$).

In an embodiment, the second ethylene-based polymer has a density from 0.850 g/cc, or 0.860 g/cc, or 0.870 g/cc to 0.875 g/cc, or 0.877 g/cc, or 0.880 g/cc, or 0.890 g/cc.

In an embodiment, the second ethylene-based polymer has a melt index from 0.1 g/10 min, or 0.5 g/10 min to 1.0 g/10 min, or 2.0 g/10 min, or 5 g/10 min, or less than or equal to 10 g/10 min.

In an embodiment, the second ethylene-based polymer has a Shore A hardness from 50, or 60, or 65, or 70, or 75 to 80, or 85, or 90.

In an embodiment, the second ethylene-based polymer has a tensile strength from greater than or equal to 3 MPa, or greater than or equal to 4 MPa, or greater than or equal to 5 MPa to 6 MPa, or 7 MPa, or 8 MPa, or 9 MPa, or 10 MPa, or 15 MPa, or 20 MPa.

In an embodiment, the second ethylene-based polymer is a POE, or further, an ethylene/alpha-olefin random copolymer and has one, some or all of the following properties: (i) a peak melting temperature from 30° C., or 35° C., or 40° C., or 45° C., or 50° C. to 55° C., or 60° C., or 65° C., or 70° C., or 75° C., or 80° C.; and/or (ii) a peak melting temperature ($T_{E2}$) lower than the peak melting temperature of the first ethylene-based polymer ($T_{E1}$); and/or (iii) a density from 0.850 g/cc, or 0.860 g/cc, or 0.870 g/cc to 0.875 g/cc, or 0.877 g/cc, or 0.880 g/cc, or 0.890 g/cc; and/or (iv) a melt index from 0.1 g/10 min, or 0.5 g/10 min to 1.0 g/10 min, or 2.0 g/10 min, or 5 g/10 min, or less than or equal to 10 g/10 min; and/or (v) a Shore A hardness from 50, or 60, or 65, or 70, or 75 to 80, or 85, or 90; and/or (vi) a tensile strength from greater than or equal to 3 MPa, or greater than or equal to 4 MPa, or greater than or equal to 5 MPa to 6 MPa, or 7 MPa, or 8 MPa, or 9 MPa, or 10 MPa, or 15 MPa, or 20 MPa.

In an embodiment, the first ethylene-based polymer has, one, two, three, four, five, or all six of properties (i)-(vi).

In an embodiment, the second ethylene-based polymer has at least properties (i), (ii) and (iv).

In an embodiment, the second composition comprises from 90 wt %, or 95 wt % to 96 wt/o, or 97 wt %, or 98 wt %, or 99 wt %, or 99.5 wt %, or 99.9 wt %, or 100 wt % of the second ethylene-based polymer, based on the total weight of the second composition.

In an embodiment, the second composition comprises the second ethylene-based polymer to the exclusion of all other polymers. In an embodiment, the second composition consists essentially of, or consists of, the second ethylene-based polymer.

In an embodiment, the second composition optionally comprises one or more additives, including, for example, processing aids, tackifiers, fillers, and other such additives useful in adhesive layers.

The second composition may comprise two or more embodiments described herein.

In an embodiment, the second composition is formed into a film. The film can be formed by casting, extrusion or molding the second composition into a substantially flat article (e.g., sheet) having a uniform thickness. Suitable films have a thickness from 10 micron, or 50 micron, or 100 micron to 0.2 mm, or 0.4 mm, or 0.6 mm, or 0.8 mm, or 1.0 mm.

In an embodiment, the film is made by compressing the second composition.

In an embodiment, the second composition is compressed at a temperature from 60° C., or 70° C., or 80° C. to 90° C., or 100° C., or 110° C., or 120°.

In an embodiment, the second composition is compressed with a compression force from 200 kN, or 250 kN to 300 kN, or 350 kN, or 400 kN.

In an embodiment, the second composition is compressed for a duration from 1 minute, or 3 minutes, or 5 minutes to 7 minutes, or 10 minutes.

In a particular embodiment, the film is made by compressing the second composition at a temperature from 60° C., or 70° C., or 80° C. to 90° C., or 100° C., or 110° C., or 120° C. with a compression force from 200 kN, or 250 kN to 300 kN, or 350 kN, or 400 kN for a duration from 1 minute, or 3 minutes, or 5 minutes to 7 minutes, or 10 minutes.

The film may comprise two or more embodiments described herein.

Vulcanized Rubber/Film Laminate

The process of adhering a foam structure to a rubber substrate comprises applying the film to a surface of the rubber substrate to form a rubber substrate/film configuration. The rubber substrate/film configuration comprises the un-vulcanized rubber substrate having at least a portion of a facial surface in contact with at least a portion of a facial surface of the film. A compression force is applied to the rubber substrate/film configuration at a temperature to form a vulcanized rubber/film laminate.

The foam structure may comprise any embodiment, or combination of embodiments, disclosed herein.

The rubber substrate may comprise any embodiment, or combination of embodiments, disclosed herein.

The film may comprise any embodiment, or combination of embodiments, disclosed herein.

The step of applying the film to a surface of the rubber substrate comprises contacting a facial surface of the film with a facial surface of the rubber substrate.

The compression force is from 200 kN, or 240 kN, or 300 kN to 340 kN, or 400 kN, or 440 kN, or 500 kN.

The compression temperature, $T_V$ (vulcanization temperature), is higher than the peak melting temperature of the second ethylene-based polymer ($T_{E2}$). In an embodiment the $T_V$ is from 130° C., or 140° C., or 150° C. to 160° C., or 170° C., or 180° C., or 190° C., or 200° C.

The compression time (vulcanization time) is from 10 min, or 12 min, or 15 min to 18 min, or 20 min.

In an embodiment, the vulcanized rubber/film laminate has a Shore A hardness from 50, or 55, or 60, or 65 to 70, or 75, or 80, or 85, or 90.

In an embodiment, the vulcanized rubber/film laminate has a density from 1.0 g/cc, or 1.1 g/cc, or 1.2 g/cc to 1.3 g/cc, or 1.4 g/cc, or 1.5 g/cc.

Vulcanized Rubber-Film/Foam Laminate

The process of adhering a foam structure to a rubber substrate further comprises the steps of applying the foam to an exposed surface of the film after the vulcanized rubber/film laminate is formed to form a vulcanized rubber-film laminate/foam configuration and applying a compression force at a temperature to form a vulcanized rubber-film/foam laminate.

The vulcanized rubber/film laminate may be any embodiment, or combination of embodiments, as disclosed herein.

The foam structure may be any embodiment, or combination of embodiments, as disclosed herein.

The step of applying the foam to an exposed surface of the film after the vulcanized rubber/film laminate is formed to form a vulcanized rubber-film laminate/foam configuration comprises contacting a facial surface of the foam with a facial surface of vulcanized rubber/film laminate.

The compression force is from 20 kN, or 25 kN, or 30 kN to 35 kN, or 40 kN, or 45 kN.

The compression temperature, $T_L$ (lamination temperature), is from 80° C., or 85° C., or 90° C. to 95° C., or less than or equal to 100° C.

In an embodiment, the $T_L \geq$ peak melting temperature ($T_{E2}$) of the second ethylene-based polymer.

In an embodiment, the $T_L \leq$ the peak melting temperature ($T_{E1}$) of the first ethylene-based polymer.

In an embodiment, the $T_L$ meets the following relationship:

$$T_{E2} \leq T_L \leq T_{E1}$$

In an embodiment, the $T_L$ meets the following relationship:

$$15° C. \leq (T_{E1}-T_L) \leq 40° C.$$

That is, in an embodiment, the difference between the peak melting temperature ($T_{E1}$) of the first ethylene-based polymer and the lamination temperature ($T_L$) is from greater than or equal to 15° C., or 20° C., or 25° C. to 30° C., or 35° C., or 40° C.

In an embodiment, the $T_L$ meets the following relationship:

$$10° C. \leq (T_L-T_{E2}) \leq 70° C.$$

That is, in an embodiment, the difference between the lamination temperature ($T_L$) and the peak melting temperature ($T_{E2}$) of the second ethylene-based polymer is from 10° C., or 15° C., or 20° C., or 25° C., or 30° C., or 35° C., or 40° C. to 45° C., or 50° C., or 55° C., or 60° C., or 65° C., or 70° C.

In an embodiment, the $T_L$ meets each of the following relationships:

$$T_{E2} \leq T_L \leq T_{E1}$$

$$15° C. \leq (T_{E1}-T_L) \leq 40° C.$$

$$10° C. \leq (T_L-T_{E2}) \leq 70° C.$$

In a further embodiment, $T_L$, further meets the relationship $10° C. \leq T_L-T_{E2} \leq 65° C.$, or $10° C. \leq T_L-T_{E2} \leq 60° C.$ The compression time (lamination time) is from 1 min, or 2 min, or 5 min to 6 min, or 8 min, or 10 min.

In an embodiment, the Asker C hardness of the foam layer of the vulcanized rubber-film/foam laminate is from 40, or 42, or 44, or 46 to 48. or 50. or 51. or 52.

In an embodiment, the foam has a hardness, after lamination, of from less than 110%, or less than or equal to 109%, or less than or equal to 108%, or less than or equal to 107%, or less than or equal to 106% to 105%, or 104%, or 103%, or 102%, or 101%, or 100%, or 99% or 98%, or 97%, or 96%, or 95%, relative to the hardness of the foam prior to lamination, wherein the relative foam hardness is calculated by $(H_1/H_0)*100\%$, wherein $H_0$ is the hardness of the foam before lamination and $H_1$ is the hardness of the foam after lamination.

In an embodiment, the bonding strength of the foam structure to the rubber substrate is greater than or equal to, or greater than, 3 N/mm. In an embodiment, the bonding strength of the foam structure to the rubber substrate is from greater than 3 N/mm, or 3.5 N/mm, or 4.0 N/mm to 4.5 N/mm, or 5.0 N/mm, or 5.5 N/mm.

In an embodiment, the failure mode after peeling test of the foam structure/rubber substrate bond is caused by foam tear.

The vulcanized rubber-film-foam laminate may comprise two or more embodiments disclosed herein.

By way of example and not limitation some embodiments of the present disclosure will now be described in detail in the following Examples.

EXAMPLES

Materials

Materials used in this study are listed in Tables 1-3 below. The composition of the foam structure and rubber substrate are also provided in Tables 2-3 below.

TABLE 1

Materials for the Adhesive Film

| Components | Description | Peak Melting Temp. ($T_{E2}$) (° C.) | Density (g/cm³) | Melt Index (g/10 min) 190° C., 2.16 kg | Tensile Strength, D638 (MPa) |
|---|---|---|---|---|---|
| ENGAGE ™ 7467 | POE, ethylene/butene copolymer | 34 | 0.862 | 1.2 | 2.0 |
| ENGAGE ™ 7447 | POE, ethylene/butene copolymer | 35 | 0.865 | 5 | 2.4 |
| ENGAGE ™ 8003 | POE, ethylene/octene copolymer | 77 | 0.885 | 1 | 18.2 |
| ENGAGE ™ 8100 | POE, ethylene/octene copolymer | 60 | 0.870 | 1 | 9.76 |
| ENGAGE ™ 8200 | POE, ethylene/octene copolymer | 59 | 0.870 | 5 | 5.7 |
| ENGAGE ™ 8407 | POE, ethylene/octene copolymer | 65 | 0.870 | 30 | 2.8 |
| ENGAGE ™ 8842 | POE, ethylene/octene copolymer | 38 | 0.857 | 1 | 3.0 |
| INFUSE ™ 9500 | OBC | 122 | 0.857 | 5 | 5.0 |

TABLE 2

Materials and Composition for Foam Structure

| Components | Description | Amount (wt %) |
|---|---|---|
| INFUSE ™ 9100 | OBC; Density: 0.877 g/cm³ (ASTM D792); MI: 1 g/10 min (ASTM D1238, 190° C., 2.16 kg); Peak Melting Temperature ($T_{E1}$): 120° C. | 90.9 |
| Luperox ™ DC40P | dicumyl peroxide (DCP) from Arkema with active peroxide content around 40 wt % | 0.73 |
| Luperox ™ DC40P-SP2 | scorch protected DCP from Arkema with active peroxide content around 40 wt % | 1.1 |
| AC9000 | Azodicarbonamide type blowing agent | 2.27 |
| ZnO | Zinc oxide, local grade | 0.23 |
| ZnSt | Zinc stearate, local grade | 0.23 |
| Atomite ™ | Calcium carbonate | 4.54 |

TABLE 3

Materials and Composition for Rubber Substrate

| Components | Description | Amount (wt %) |
|---|---|---|
| Ultrasil VN3 (Filler) | Precipitated silica from Evonik (specific surface area (N2) multipoint 180 m²/g; SiO₂ content ≥ 97%) | 20.91 |
| Kadox 720 (Curing Additive) | Zinc oxide from The HallStar Company (assay 99.8%, specific gravity 5.61) | 2.61 |
| Akrochem MBTS (Accelerator) | 2'2 dibenzothiazyl disulfide from Akrochem Corporation (specific gravity 1.5; inching point 174° C.) | 0.78 |
| Akrochem TMTD (Accelerator) | Tetramethylthiuram disulfide from Akrochem Corporation (specific gravity 1.43; melting point 148° C.) | 0.4 |
| NORDEL ™ IP 4770 | ethylene propylene diene terpolymer manufactured by Dow (Mooney viscosity (ML1 + 4 at 125° C.) 70 MU; ethylene 70%; ENB 4.9%) | 52.27 |
| Sunpar 2280 | Paraffinic oil from Sun Oil Company (density at 15° C. 0.899; flash point 305° C.) | 20.91 |
| Butyl Zimate (Accelerator) | Zinc dibutyldithiocarbamate from Vanderbilt Chemicals (density 1.21 g/cm³; melting range 104-112° C.) | 0.52 |
| DPTT-70 (Accelerator) | Polymeric masterbatch containing 70% dipentamethylene thiuramtetrasulfide | 0.56 |
| Stearic Acid (Processing Aid) | | 0.52 |
| Sulfur (Curing Agent) | | 0.52 |

Preparation of the Foam Structure

The OBC is added to a 1.5 liter Branbury mixer. The ZnO, ZnSt and CaCO₃ are added after the OBC is melted (around 5 minutes). The blowing agent and peroxide are added last and mixed for another 3-5 minutes for a total mix time of 15 minutes. Roll milled blankets are cut into squares and placed inside a pre-heated bun foam mold. The preheating is conducted for 9 minutes at 120° C. and pressed at 100 kN for 4 minutes. The preheated mass is transferred to the foaming press and held for 10 minutes at 100 kg/cm² and 180° C. Once the pressure is released, the bun foam is removed quickly from the tray and placed in a vent hood on several non-stick sheets. It is allowed to cool overnight and then cut into slices to be prepared for lamination with the rubber substrate.

Preparation of Uncured Rubber Substrate

The ingredients listed in Table 3, above, are melt compounded using the internal mixer (3000 cc volume, 72% fill factor) and a 6" Reliable Roll Mill to get a 5 mm thickness sheet.

Preparation of the Adhesive Film (Second Composition)

The POE or OBC pellets are put into a 0.5 mm mold (15 cm square) which was further subjected to hot compression at 130° C. for 5 minutes with a compression force of 270 kN. The adhesive film has a thickness of 0.5 mm.

Preparation of the Vulcanized Rubber/Film Laminate

The uncured rubber substrate is cold pressed by two roll mill into a 1 mm sheet at 100° C. for 10 minutes with a compression force of 200 kN. The adhesive film is stacked with the rubber substrate and put into the rubber vulcanization mold (15 cm square mold). The mold is subjected to hot compression at 160° C. for 15 minutes with a compression force of 300 kN to form the vulcanized rubber/film laminate.

Preparation of the Vulcanized Rubber-Film/Foam Laminate

The foam structure (one slice) is stacked on the exposed adhesive film side of the vulcanized rubber/film laminate, to form a pre-structure. A one inch piece of release paper is inserted at one end of the pre-structure to prevent the film from adhering to the rubber substrate at that spot to form un-adhered ends, such as shown in FIG. 1. The structure is laminated in a hot press machine at different temperatures as shown in Table 4, below, for 5 minutes with a compression force of 30 kN. In this step, the compression force was set low to avoid the deformation of the foam samples during compression. The final articles are each three-layered structures having a vulcanized rubber-film laminate/foam configuration. The foam layer is approximately 3-5 mm thick, the adhesive film layer is less than 0.5 mm thick, and the rubber layer is approximately 1 mm, with a resulting total thickness of approximately 5 mm. The total length of the final articles is 15 cm and the total width of the final articles is 7.5 cm.

TABLE 4

Lamination Temperatures and Properties of the Vulcanized Rubber-Film Laminate/Foam Structures

| Example No. | Ethylene-Based Polymer of Adhesive Film | Lamination Temp. (°C.) (TL) | Asker C Hardness of the Foam Structure After Lamination | Hardness v. Control Foam Structure | Bonding Strength (N/mm) | $T_{E1}$ (Peak Melting Temp. of the Ethylene-Based Polymer of the Foam) (°C.) | $T_{E2}$ (Peak Melting Temp. of the Ethylene-Based Polymer of the Adhesive) (°C.) | $MI_{E2} \leq$ 10 g/10 min | 38° C. $\leq$ $T_{E2}$ | $T_{E2} \leq T_V$ ($T_V = 160°$ C.) | $T_{E2} < T_L < T_{E1}$ | 15° C. $\leq$ ($T_{E1} - T_L$) $\leq$ 40° C. | 10° C. $\leq$ ($T_L - T_{E2}$) $\leq$ 70° C. | Comments |
|---|---|---|---|---|---|---|---|---|---|---|---|---|---|---|
| Control | Foam Control | NA | 47.6 (control-no lamination) | 100% | NA | 120 | NA | NA | NA | NA | NA | NA | NA | Blank Foam, no lamination |
| CS1 | 7467 | 110 | 57.1 | 120% | 4.1 | 120 | 34 | 1.2 Yes | No | Yes | 34/110/120 Yes | 15/(120-110)/40 No | 10/(110-34)/70 No | Failed 2 |
| CS2 | 7467 | 120 | 62.1 | 130% | 4.6 | 120 | 34 | 1.2 Yes | No | Yes | 34/120/120 Yes | 15/(120-120)/40 No | 10/(120-34)/70 No | Failed 2 |
| CS3 | 7447 | 90 | 50.4 | 106% | 1.4 | 120 | 35 | 5.0 Yes | No | Yes | 35/90/120 Yes | 15/(120-90)/40 No | 10/(90-35)/70 No | Failed 1 |
| CS4 | 7447 | 100 | 48 | 101% | 1.3 | 120 | 35 | 5.0 Yes | No | Yes | 35/100/120 Yes | 15/(120-100)/40 No | 10/(100-35)/70 No | Failed 1 |
| CS5 | 7447 | 110 | 56.4 | 118% | 2.7 | 120 | 35 | 5.0 Yes | No | Yes | 35/110/120 Yes | 15/(120-110)/40 No | 10/(110-35)/70 No | Failed 1 & 2 |
| CS6 | 7447 | 120 | 59.4 | 125% | 2.7 | 120 | 35 | 5.0 Yes | No | Yes | 35/120/120 No | 15/(120-120)/40 No | 10/(120-35)/70 No | Failed 1 & 2 |
| IE1 | 8003 | 90 | 47.7 | 100% | 3.4 | 120 | 77 | 1.0 Yes | Yes | Yes | 77/90/120 Yes | 15/(120-90)/40 Yes | 10/(90-77)/70 Yes | Preferred |
| IE2 | 8003 | 100 | 49.2 | 103% | 3.4 | 120 | 77 | 1.0 Yes | Yes | Yes | 77/100/120 Yes | 15/(120-100)/40 Yes | 10/(100-77)/70 Yes | Preferred |
| CS7 | 8003 | 110 | 52.6 | 111% | 3.4 | 120 | 77 | 1.0 Yes | Yes | Yes | 77/110/120 Yes | 15/(120-110)/40 No | 10/(110-77)/70 Yes | Failed 2 |
| CS8 | 8003 | 120 | 58 | 122% | 5.9 | 120 | 77 | 1.0 Yes | Yes | Yes | 77/120/120 No | 15/(120-120)/40 No | 10/(120-77)/70 Yes | Failed 2 |
| IE3 | 8100 | 90 | 46.3 | 97% | 5.6 | 120 | 60 | 1.0 Yes | Yes | Yes | 60/90/120 Yes | 15/(120-90)/40 Yes | 10/(90-60)/70 Yes | Preferred |
| IE4 | 8100 | 100 | 47.3 | 99% | 3.8 | 120 | 60 | 1.0 Yes | Yes | Yes | 60/100/120 Yes | 15/(120-100)/40 Yes | 10/(100-60)/70 Yes | Preferred |
| CS9 | 8100 | 110 | 52.1 | 110% | 3.6 | 120 | 60 | 1.0 Yes | Yes | Yes | 60/110/120 Yes | 15/(120-110)/40 No | 10/(110-60)/70 Yes | Failed 2 |
| CS10 | 8100 | 120 | 57.9 | 122% | 5.6 | 120 | 60 | 1.0 Yes | Yes | Yes | 60/120/120 No | 15/(120-120)/40 No | 10/(120-60)/70 Yes | Failed 2 |
| IE5 | 8200 | 90 | 45.7 | 96% | 3.1 | 120 | 59 | 5.0 Yes | Yes | Yes | 59/90/120 Yes | 15/(120-90)/40 Yes | 10/(90-59)/70 Yes | Preferred |
| IE6 | 8200 | 100 | 47.9 | 101% | 3.6 | 120 | 59 | 5.0 Yes | Yes | Yes | 59/100/120 Yes | 15/(120-100)/40 Yes | 10/(100-59)/70 Yes | Accepted |
| CS11 | 8200 | 110 | 53.8 | 113% | 5.4 | 120 | 59 | 5.0 Yes | Yes | Yes | 59/110/120 Yes | 15/(120-110)/40 No | 10/(110-59)/70 Yes | Failed 2 |
| CS12 | 8200 | 120 | 57.4 | 121% | 6.0 | 120 | 59 | 5.0 Yes | Yes | Yes | 59/120/120 No | 15/(120-120)/40 No | 10/(120-59)/70 Yes | Failed 2 |

TABLE 4-continued

Lamination Temperatures and Properties of the Vulcanized Rubber-Film Laminate/Foam Structures

| Example No. | Ethylene-Based Polymer of Adhesive Film | Lamination Temp. (°C.) (TL) | Asker C Hardness of the Foam Structure After Lamination | Hardness v. Control Foam Structure | Bonding Strength (N/mm) | $T_{E1}$ (Peak Melting Temp. of the Ethylene-Based Polymer of the Foam) (°C.) | $T_{E2}$ (Peak Melting Temp. of the Ethylene-Based Polymer of the Adhesive) (°C.) | $MI_{E2} \leq$ 10 g/10 min | 38° C. $\leq T_{E2}$ | $T_{E2} \leq T_V$ ($T_V =$ 160° C.) | $T_{E2} < T_L <$ $T_{E1}$ | 15° C. $\leq$ ($T_{E1} - T_L$) $\leq$ 40° C. | 10° C. $\leq$ ($T_L - T_{E2}$) $\leq$ 70° C. | Comments |
|---|---|---|---|---|---|---|---|---|---|---|---|---|---|---|
| CS13 | 8407 | 90 | 45.9 | 96% | 2.7 | 120 | 65 | 30.0 No | Yes | Yes | 65/90/120 Yes | 15/(120-90)/40 Yes | 10/(90-65)/70 Yes | Failed 1 |
| CS14 | 8407 | 110 | 51.6 | 108% | 2.5 | 120 | 65 | 30.0 No | Yes | Yes | 65/110/120 Yes | 15/(120-110)/40 No | 10/(110-65)/70 Yes | Failed 1 |
| CS15 | 8407 | 120 | 60.7 | 128% | 2.8 | 120 | 65 | 30.0 No | Yes | Yes | 65/120/120 No | 15/(120-120)/40 No | 10/(120-65)/70 Yes | Failed 1 & 2 |
| IE7 | 8842 | 100 | 46.2 | 97% | 3.2 | 120 | 38 | 1.0 Yes | Yes | Yes | 38/100/120 Yes | 15/(120-100)/40 Yes | 10/(100-38)/70 Yes | Accepted |
| CS16 | 8842 | 110 | 54.7 | 115% | 3.3 | 120 | 38 | 1.0 Yes | Yes | Yes | 38/110/120 Yes | 15/(120-110)/40 Yes | 10/(110-38)/70 No | Failed 2 |
| CS17 | 8842 | 120 | 60.2 | 126% | 3.9 | 120 | 38 | 1.0 Yes | Yes | Yes | 38/120/120 No | 15/(120-120)/40 No | 10/(120-38)/70 No | Failed 2 |
| CS18 | 9500 | 90 | 47.6 | 100% | 0.0 | 120 | 122 | 5.0 Yes | Yes | Yes | 122/90/120 No | 15/(120-90)/40 Yes | 10/(90-122)/70 No | Failed 1 |
| CS19 | 9500 | 100 | 48.6 | 102% | 0.0 | 120 | 122 | 5.0 Yes | Yes | Yes | 122/100/120 No | 15/(120-100)/40 yES | 10/(100-122)/70 No | Failed 1 |
| CS20 | 9500 | 110 | 51.7 | 109% | 2.4 | 120 | 122 | 5.0 Yes | Yes | Yes | 122/110/120 No | 15/(120-110)/40 No | 10/(110-122)/70 No | Failed 1 |
| CS21 | 9500 | 120 | 60.2 | 126% | 3.7 | 120 | 122 | 5.0 Yes | Yes | Yes | 122/120/120 No | 15/(120-120)/40 No | 10/(120-122)/70 No | Failed 2 |

Failed 1 = Bonding strength is less than 3 N/mm
Failed 2 = Hardness v. Control foam structure is greater than 110%
Acceptable = Bonding strength greater than 3 N/mm
Preferred = Bonding strength greater than 3 N/mm with foam tear (material broken) at bond fail As shown by the results in Table 4, a lamination temperature of greater than 100° C. results in shrinkage of the foam structure during lamination, as evidenced by the increase in hardness. Vulcanized rubber-film laminate/foam structures which were laminated at a temperature greater than 100° C. had a foam hardness of greater than 110% relative to the foam hardness of the control. It was also discovered that adhesive film layers of OBC resulted in vulcanized rubber-film laminate/foam structures having unacceptable foam hardness (greater than 110% relative to the foam hardness of the control) due to their higher melting points. POEs have lower melting points and lower lamination temperatures can therefore be used as adhesive films.

With the samples using POE as the adhesive film, those vulcanized rubber-film laminate/foam structures using a POE having a density of less than 0.858 g/cm³ in the adhesive film showed lower bond strength compared to the other vulcanized rubber-film laminate/foam structures. Using a POE having a density of greater than 0.890 g/cm³ in the adhesive film required a higher lamination temperature to be used, resulting in increased foam shrinkage. Bond strength is also improved in the samples using a POE with a melt index between 1 g/10 min and 5 g/10 min in the adhesive layer.

In sum, it was surprisingly discovered that a foam structure formed of a first composition with a first ethylene-based polymer having a peak melting temperature ($T_{E1}$) and a rubber substrate adhere to one another when a film formed of a second composition with a second ethylene-based polymer having a peak melting temperature ($T_{E2}$) is first laminated to the rubber substrate used as an adhesive layer between the rubber substrate and foam structure when (1) the second ethylene-based polymer has a melt index of less than or equal to 10 g/10 min, (2) the rubber substrate and film are laminated by applying a compression force to the rubber substrate/film configuration at a temperature $T_v$, wherein 38° C.$\leq T_{E2} < T_v$ (resulting in a vulcanized rubber/film laminate), (3) the foam is laminated to the vulcanized rubber/film laminate by applying a compression force to the vulcanized rubber-film laminate/foam configuration at a temperature $T_L$, wherein $T_{E2} < T_L < T_{E1}$, (4) 15° C.$\leq (T_{E1}-T_L) \leq$40° C., and (4) 10° C.$\leq (T_L-T_{E2}) \leq$70° C. As shown in Table 4, above, processes in which each of the requirements (1)-(4) specified above result in a structure having insufficient bonding strength (less than 3 N/mm) and/or a structure having an unacceptable increase in foam hardness (Hardness v. Control foam structure is greater than 110%), FIG. 1 is a side elevation view of a vulcanized rubber-film/foam laminate.

The invention claimed is:

1. A process of adhering a foam structure to a rubber substrate, wherein the foam structure is formed from a first composition comprising a first ethylene-based polymer having a peak melting temperature $T_{E1}$, the process comprising the following steps:
   a) applying a film formed from a second composition comprising a second ethylene-based polymer to a surface of the rubber substrate to form a rubber substrate/film configuration, wherein the second ethylene-based polymer has a melt index of less than or equal to 10 g/10 min and a peak melting temperature $T_{E2}$;
   b) applying a compression force to the rubber substrate/film configuration at a temperature $T_v$, wherein 38° C.$\leq T_{E2} \leq T_v$ to form a vulcanized rubber/film laminate having an exposed surface of the film;
   c) applying the foam structure to the exposed surface of the film to form a vulcanized rubber-film laminate/foam configuration; and
   d) applying a compression force to the vulcanized rubber-film laminate/foam configuration at a temperature $T_L$, wherein $T_{E2} < T_L < T_{E1}$, 15° C.$\leq (T_{E1}-T_L) \leq$40° C., and 10° C.$\leq (T_L-T_{E2}) \leq$70° C. to form a vulcanized rubber-film/foam laminate.

2. The process of claim 1, wherein the second ethylene-based polymer has a tensile strength of greater than or equal to 3 MPa.

3. The process of claim 2, wherein the second ethylene-based polymer is an ethylene/alpha-olefin interpolymer.

4. The process of claim 3, wherein the second ethylene-based polymer has a density from 0.860 g/cm³ to 0.885 g/cm³ and a melt index from 1.0 g/10 min to 5.0 g/10 min.

5. The process of claim 4, wherein the first ethylene-based polymer is an ethylene/alpha-olefin multi-block copolymer.

6. The process of claim 5, wherein the first ethylene-based polymer has a melt index 0.5 g/10 min to 5.0 g/10 min.

7. The process of claim 6, wherein the first composition comprises from 85 wt % to 95 wt % of the first ethylene-based polymer, based on the total weight of the first composition.

8. The process of claim 7, wherein the second composition comprises 95 wt % to 100 wt % of the second ethylene-based polymer, based on the total weight of the second composition.

9. The process of claim 8, wherein the second composition comprises the second ethylene-based polymer to the exclusion of all other polymers.

10. The process of claim 9, wherein the vulcanized rubber-film/foam laminate has a bond strength greater than or equal to 3 N/mm.

11. The process of claim 10, wherein the $T_L \leq$100° C.

* * * * *

UNITED STATES PATENT AND TRADEMARK OFFICE
CERTIFICATE OF CORRECTION

| | |
|---|---|
| PATENT NO. | : 11,752,751 B2 |
| APPLICATION NO. | : 17/277565 |
| DATED | : September 12, 2023 |
| INVENTOR(S) | : Yu et al. |

It is certified that error appears in the above-identified patent and that said Letters Patent is hereby corrected as shown below:

On the Title Page

Assignee: Replace "The Dow Chemical Company" with -- Dow Global Technologies LLC Midland, MI (US) --

Signed and Sealed this
Tenth Day of September, 2024

Katherine Kelly Vidal
*Director of the United States Patent and Trademark Office*